(12) United States Patent
Lozar, Jr.

(10) Patent No.: US 10,935,400 B2
(45) Date of Patent: Mar. 2, 2021

(54) LASER ALIGNMENT TOOL

(71) Applicant: William H Lozar, Jr., Pavillion, WY (US)

(72) Inventor: William H Lozar, Jr., Pavillion, WY (US)

(*) Notice: Subject to any disclaimer, the term of this patent is extended or adjusted under 35 U.S.C. 154(b) by 0 days.

(21) Appl. No.: 16/663,220

(22) Filed: Oct. 24, 2019

(65) Prior Publication Data

US 2020/0132523 A1    Apr. 30, 2020

Related U.S. Application Data

(60) Provisional application No. 62/750,061, filed on Oct. 24, 2018.

(51) Int. Cl.
| | | |
|---|---|---|
| G01D 13/22 | (2006.01) | |
| G01B 11/27 | (2006.01) | |
| G01D 5/26 | (2006.01) | |

(52) U.S. Cl.
CPC ............. *G01D 13/22* (2013.01); *G01B 11/27* (2013.01); *G01D 5/262* (2013.01)

(58) Field of Classification Search
CPC ........ G01D 13/22; G01D 5/262; G01B 11/27; B25B 27/16
See application file for complete search history.

(56) References Cited

U.S. PATENT DOCUMENTS

| | | | | |
|---|---|---|---|---|
| 5,568,265 A | * | 10/1996 | Matthews .............. | G01B 11/27 33/286 |
| 6,098,297 A | | 8/2000 | Belfiore | |
| 6,124,935 A | * | 9/2000 | Matthews ............. | G01C 15/008 33/286 |
| 6,178,649 B1 | * | 1/2001 | Wu ....................... | G01C 15/002 33/286 |
| 6,643,019 B1 | | 11/2003 | Jeanneret | |
| 7,793,423 B2 | * | 9/2010 | Loftis .................... | G01B 11/27 33/286 |
| 8,893,395 B2 | * | 11/2014 | Mickow ............... | G01C 15/002 33/286 |
| 9,080,864 B1 | | 7/2015 | McCarthy | |
| 10,302,426 B2 | * | 5/2019 | Choules ................. | G01B 11/27 |
| 10,309,776 B2 | * | 6/2019 | Doeren .................... | G01C 9/28 |

(Continued)

OTHER PUBLICATIONS

"Tunable diode laser analyzer", ABB Group, http://search-ext.abb.com/library/Download.aspx?DocumentID=BUA422450EN&LanguageCode=en&DocumentPartId=&Action=Launch.

(Continued)

*Primary Examiner* — Lisa M Caputo
*Assistant Examiner* — Tania Courson

(57) ABSTRACT

The present invention is a laser aligning tool that has two weight bodies, a laser pointer unit, and a threaded tubular shaft. The laser pointer unit is positioned within one of the two weight bodies. While both weight bodies are similar in shape and mass, and both connected to the threaded tubular shaft, only the weight body without the laser pointer unit can be detached from the threaded tubular shaft. The user may remove and place one weight body to the flange opening and introduce the threaded tubular shaft with the other weight body to the opening of another flange in preparation of alignment. The user may then turn on the laser pointer unit and ensure the laser beam traverse through both threaded tubular shaft and the detached weight body for proper alignment.

5 Claims, 11 Drawing Sheets

(56) References Cited

U.S. PATENT DOCUMENTS

| | | | | |
|---|---|---|---|---|
| 2002/0170190 A1* | 11/2002 | Wetterlind | ............ | G01B 11/26 |
| | | | | 33/286 |
| 2006/0196060 A1* | 9/2006 | Suing | .................. | G01B 11/272 |
| | | | | 33/286 |
| 2007/0204473 A1* | 9/2007 | Dillon | .................... | B23P 19/06 |
| | | | | 33/286 |
| 2011/0167656 A1* | 7/2011 | Huang | .................... | H01S 5/005 |
| | | | | 33/286 |
| 2012/0117813 A1* | 5/2012 | Stevenson | ........... | G01C 15/002 |
| | | | | 33/286 |
| 2014/0115907 A1* | 5/2014 | Gamon | ............... | G01C 15/004 |
| | | | | 33/286 |

OTHER PUBLICATIONS

"Rotalign Ultra iS—Laser Shaft Alignment", Parla Tech, http://www.parla-tech.com/rotalign-ultra-is-laser-shaft-alignment.php.
"Laser Shaft Alignment System", Indiamart, https://www.indiamart.com/proddetail/laser-shaft-alignment-system-13287198862.html.

* cited by examiner

LASER ALIGNMENT TOOL

The current application claims a priority to the U.S. Provisional Patent application Ser. No. 62/750,061 filed on Oct. 24, 2018.

FIELD OF THE INVENTION

The present invention generally relates to flange alignment. More specifically, the present invention is a laser alignment tool that can be partially detached and place against the openings of one or more flanges so the user may turn on the laser pointer unit and properly align those flanges together. The present invention can also be used to properly align the flange on a riser with the carrier pipe.

BACKGROUND OF THE INVENTION

Pipe is a very important part of modern-day ground construction. Workers need to install many pipes in various sizes to cover different purposes, such as sewage or utility, gas lines, oil lines etc. However, many issues arise as the construction workers try to join one pipe to the other. Due to the mass and size of those large pipes, workers need an alignment tool to properly align those giant pipes during the joining process. The alignment tool also needs to be adaptive enough to fit into different sizes of flanges, capable of quickly aligning one or more flanges with minimum effort, and also stable enough to be fitted onto different flanges. Moreover, the alignment tool also needs to be adaptive enough to various alignment process, such as aligning a riser pipe and a carrier pipe, aligning pipe to a tank or reservoir, or simply connecting two pipes together in different angles.

The present invention provides a laser alignment tool capable of solving all issues mentioned above. The present invention comprises two weight bodies, a laser pointer unit, and a tubular shaft between the two weight body. Since the two weight bodies are identical in shape and weight and have conical surfaces, the user may detach and place one weight body to the opening of one flange and introduce the tubular shaft with the other weight body to the opening of another flange. The conical surface of the weight body is adaptive to different sizes of flange openings so workers only need to bring one set of the present invention. Moreover, the laser pointer unit is easy to operate and align. The user only needs to turn on the laser pointer and ensure the laser beam traverse through both the tubular shaft and the detached weight body. Once properly aligned, the user may proceed to move the two pipes closer to each other, and eventually joined and lock the two flanges together. It also eliminates the use of the human eye to align the flange with the carrier pipe to avoid inaccuracy.

DETAIL DESCRIPTIONS OF THE INVENTION

Figure 1:
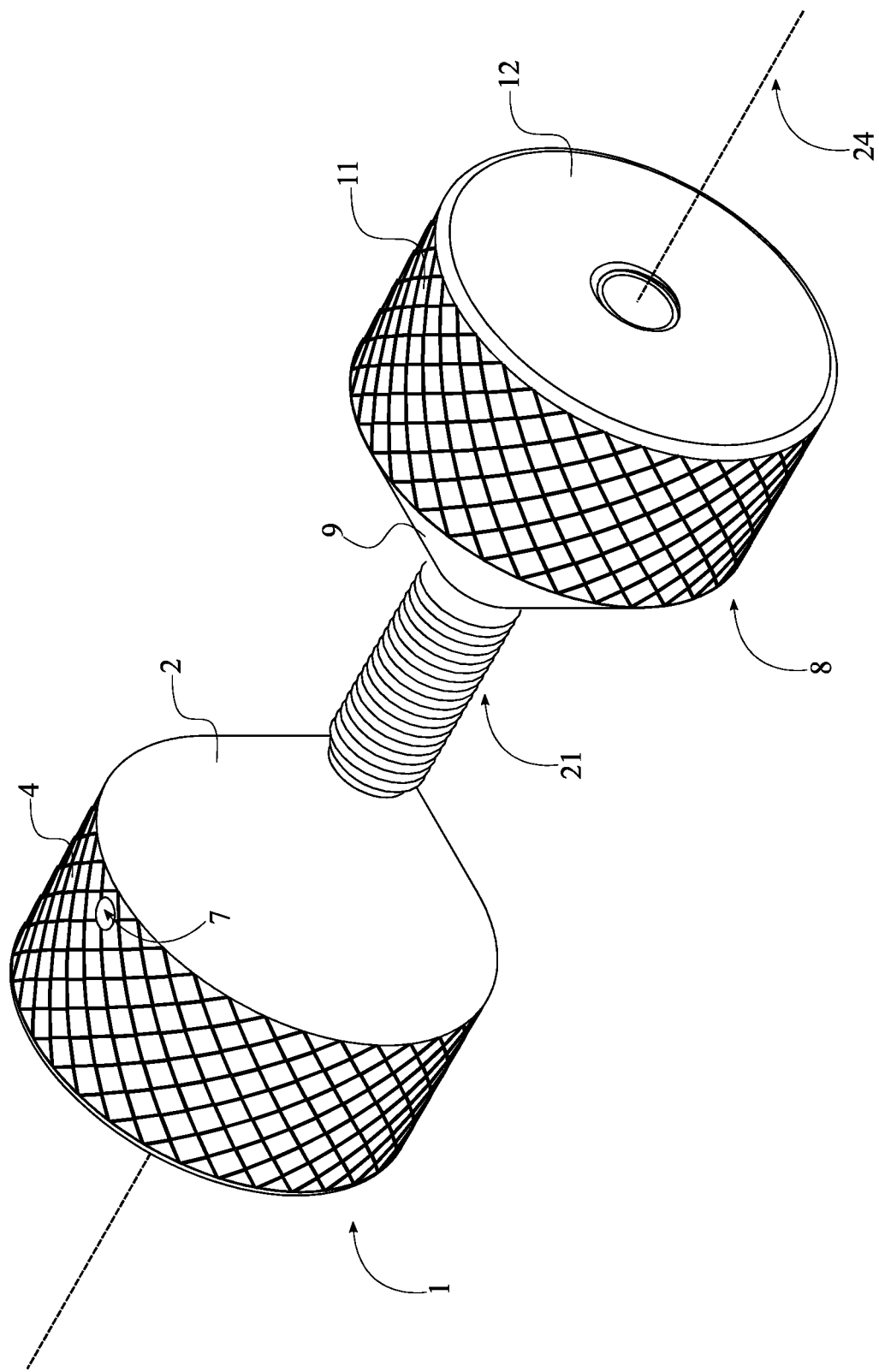
FIG. 1 is an isometric perspective view of the present invention.
Figure 2:
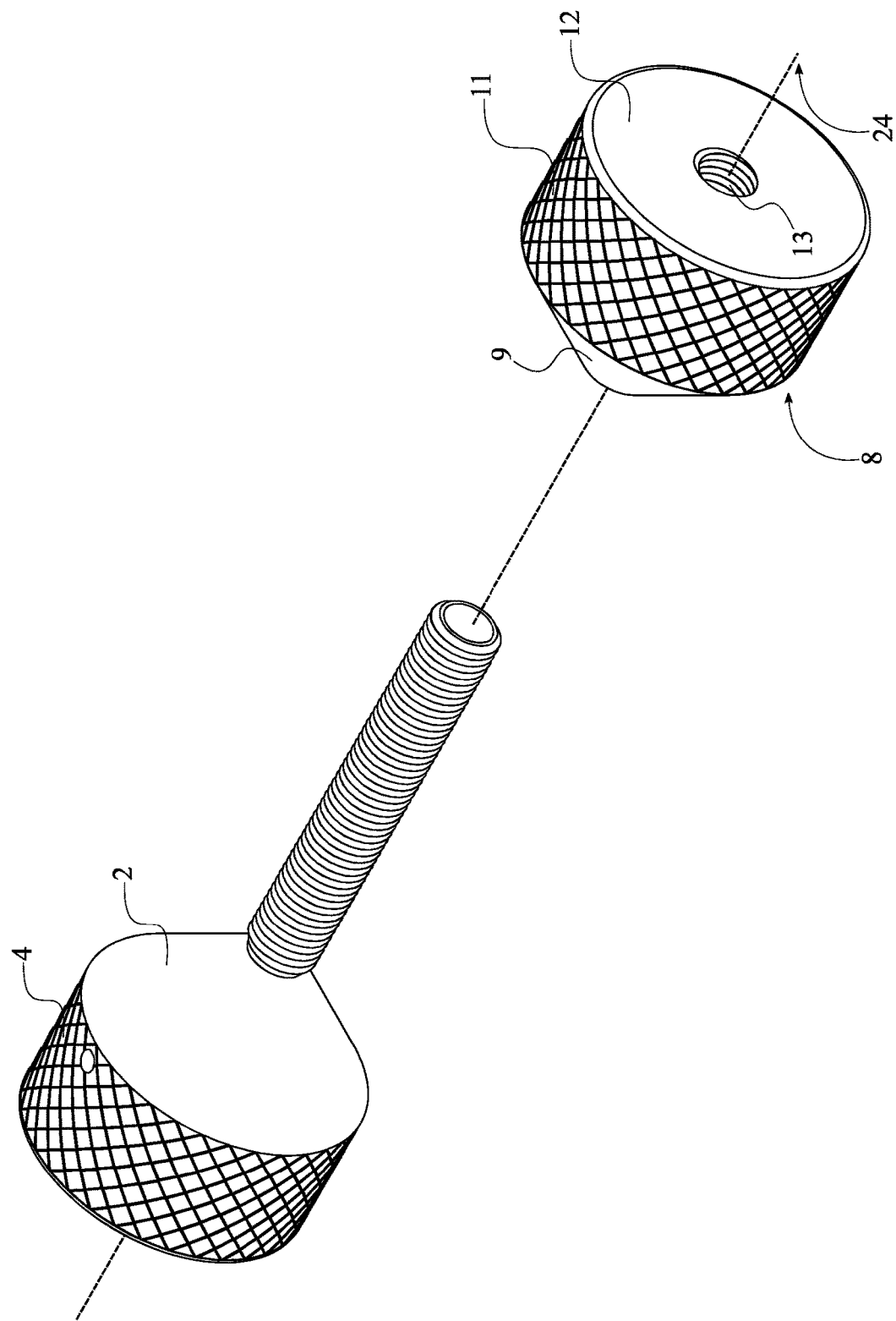
FIG. 2 is an isometric perspective view of the present invention with second weight body removed from the threaded tubular shaft.

All illustrations of the drawings are for the purpose of describing selected versions of the present invention and are not intended to limit the scope of the present invention.

In reference to FIGS. 1-3, 5 and 7, the present invention is an alignment tool with a laser pointer for aligning flanges on various objects, such as pipes. The present invention can also be used for tanks and various vessels to align tie down points with anchor bolts. The present invention comprises a first weight body 1, a second weight body 8, a laser pointer unit 14, a threaded tubular shaft 21, and a central axis 24. The first weight body 1, the second weight body 8, the laser pointer unit 14, and the threaded tubular shaft 21 are concentrically positioned along the central axis 24. This configuration is to ensure proper alignment during both installation and aligning process. The user may introduce the threaded tubular shaft 21 into one of the openings on the flange during the alignment process. The threaded tubular shaft 21 comprises a first end 22 and a second end 23. The first weight body 1 is terminally connected with the first end 22 of the threaded tubular shaft 21. The second weight body 8 is threadedly engaged with the second end 23 of the threaded tubular shaft 21. The user may disengage the second weight body 8 from the second end 23, then introduce the second end 23 into one of the openings on the flange to start the alignment process. The user may fully traverse the threaded tubular shaft 21 through the flange so the first weight body 1 contacts with the flange. The user may place the second weight body 8 on the other flange, then turn on the laser to start aligning both flanges. The laser pointer unit 14 is internally connected to the first weight body 1. The user may turn on the laser pointer unit 14 and project a beam of laser through the threaded tubular shaft 21 and the second weight body 8 during the alignment process.

Figure 3:
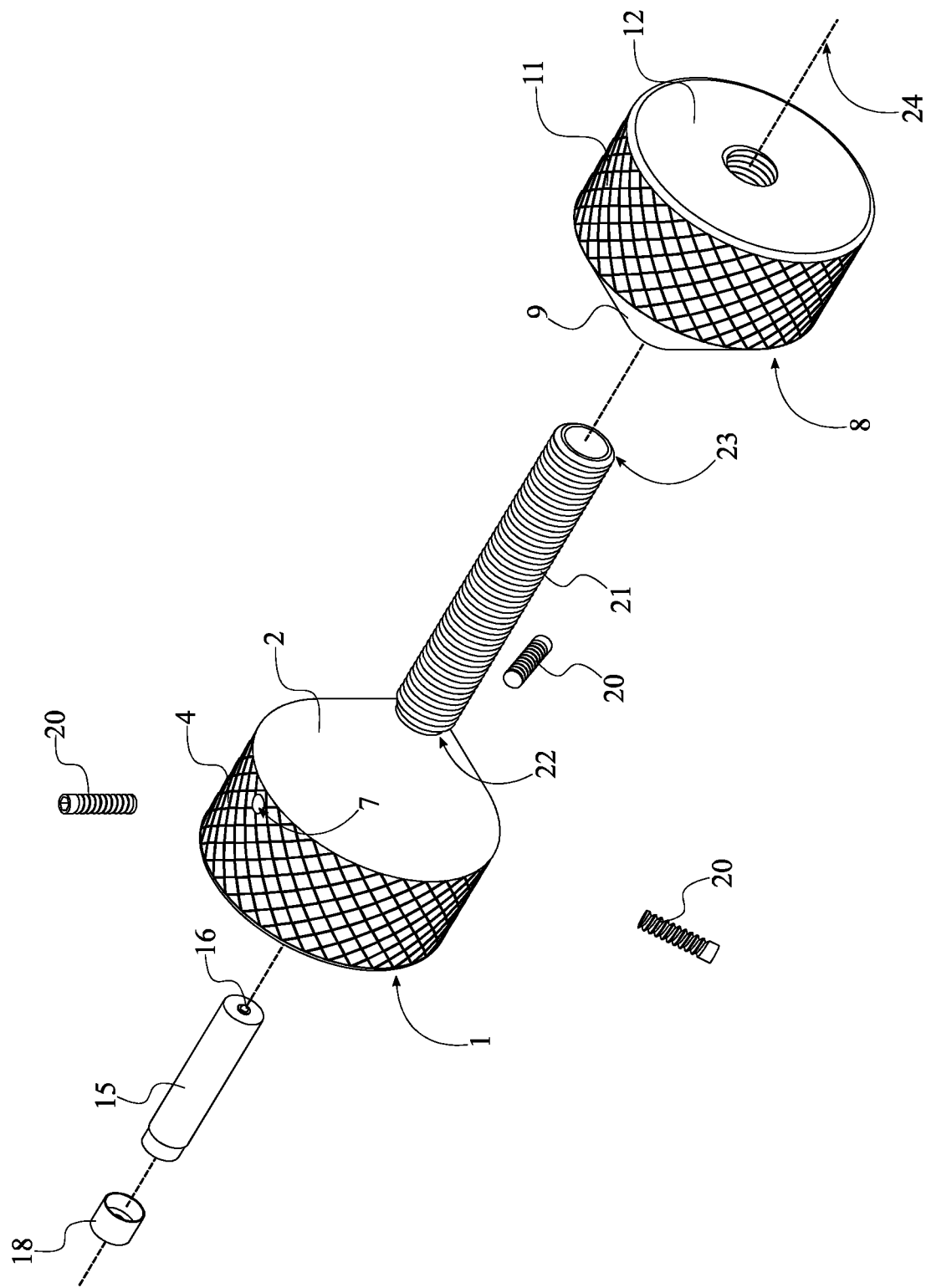
FIG. 3 is a perspective exploded view of the present invention.
Figure 4:
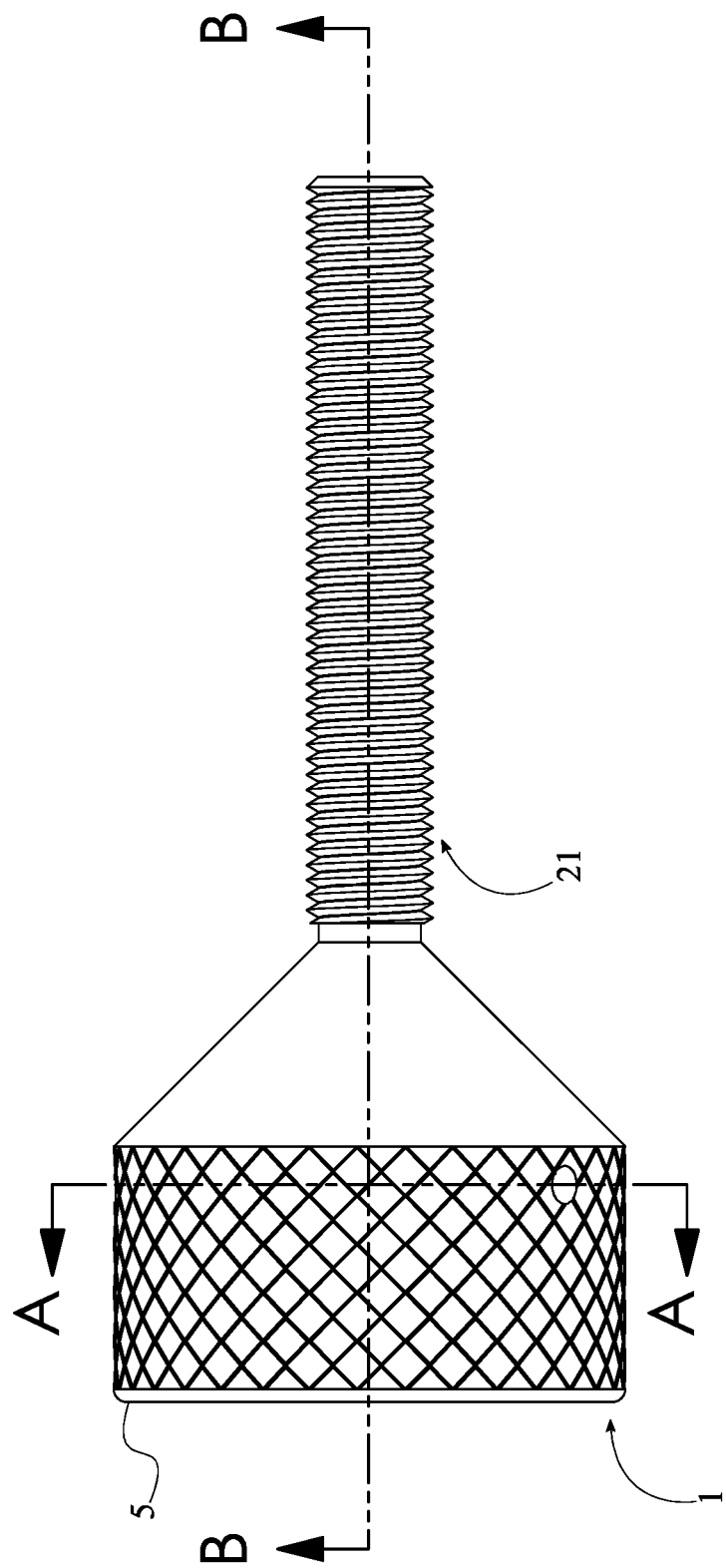
FIG. 4 is a side view of the first weight body and the threaded tubular shaft, showing the plan upon which a cross section view is taken shown in FIG. 5 and FIG. 6.
Figure 5:
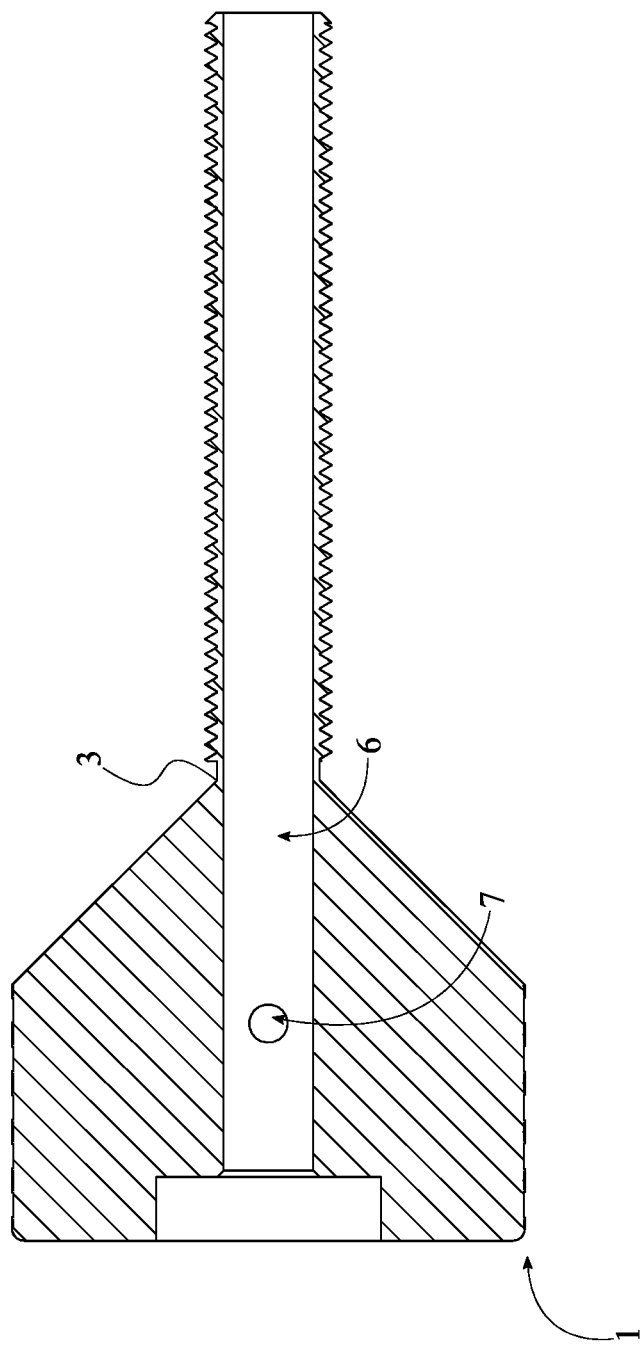
FIG. 5 is a cross section view of the first weight body and the threaded tubular shaft taken along line B-B of FIG. 4.

In reference to FIG. 3-5, the first weight body 1 comprises a first conical surface 2, a first cylindrical surface 4, and a first base surface 5. The first conical surface 2 is perimetrically connected around the first cylindrical surface 4, opposite of the first base surface 5. The first conical surface 2 is configured to allow the first weight body 1 to occupy any space unfilled by the threaded tubular shaft 21 as the user fully introduces the threaded tubular shaft 21 into the flange opening. The first conical surface 2 comprises a first apex 3. The first apex 3 is externally oriented about the first weight body 1. In other words, the first apex 3 is facing toward the threaded tubular shaft 21 and allows the laser to traverse through the threaded tubular shaft 21 toward the second weight body 8. The first cylindrical surface 4 is perimetrically connected around the first base surface 5. The first cylindrical surface 4 is configured to contain the laser pointer unit 14, and also to provide enough surface area for the user to hold onto during the alignment process. The first base surface 5 is concentrically positioned around the central axis 24. The first base surface 5 is configured to hold the switch of the laser pointer unit 14 and should be kept parallel with the flange during the alignment process.

In reference to FIG. 3-6, the first weight body 1 further comprises an access channel 6 and a plurality of fastener openings 7. The access channel 6 traverses through the first weight body 1 along the central axis 24. The access channel 6 is configured to hold the laser pointer unit 14. The plurality of fastener openings 7 is radially distributed around the first cylindrical surface 4 of the first weight body 1. This configuration enables the user to realign and calibrate the laser pointer unit 14 when the user notices that the beam of laser from the laser pointer unit 14 is not parallel from the central axis 24. The plurality of fastener openings 7 traverses into the first weight body 1 from the first cylindrical surface 4 to the access channel 6 thus providing sufficient void area receive a plurality of alignment fasteners 20 of the present invention.

Figure 7:
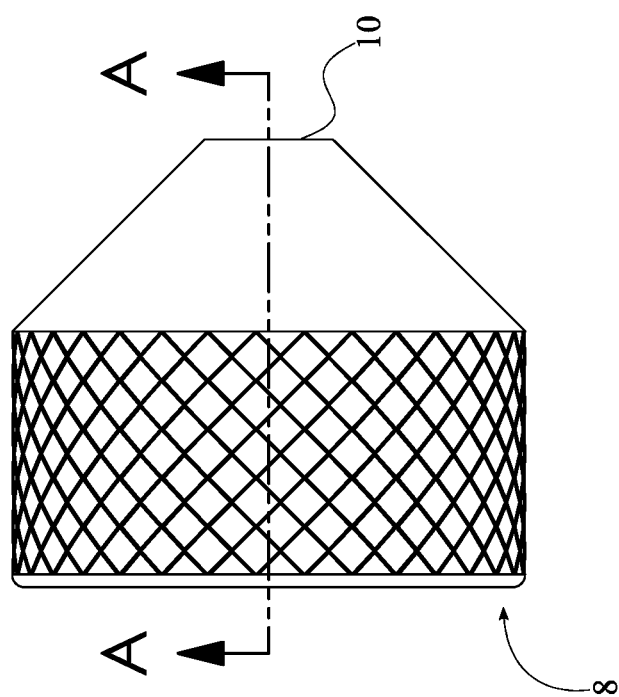
FIG. 7 is a side view of the second weight body, showing the plan upon which a cross section view is taken shown in FIG. 8.
Figure 8:
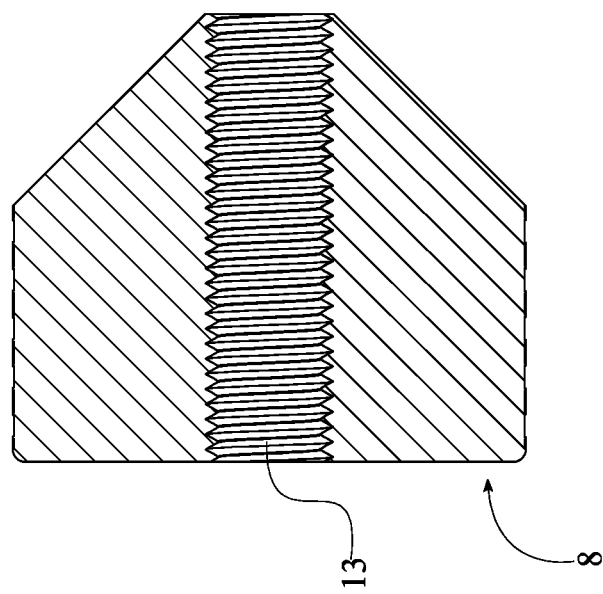
FIG. 8 is a cross section view of the second weight body taken along line A-A of FIG. 7.

In reference to FIGS. 3, 7, and 8, the second weight body 8 comprises a second conical surface 9, a second cylindrical surface 11, a second base surface 12, and a threaded channel 13. The second conical surface 9 is perimetrically connected around the second cylindrical surface 11, opposite of the second base surface 12. The second conical surface 9 is configured to allow the second weight body 8 to occupy the entire flange opening as the user fully place the second weight body 8 on the other flange during the alignment process. The second conical surface 9 comprises a second apex 10. The second apex 10 is externally oriented about the second weight body 8. In other words, the second apex 10 is facing toward the threaded tubular shaft 21 and allows the beam of laser to traverse through the threaded tubular shaft 21 toward the second weight body 8. The second cylindrical surface 11 is perimetrically connected around the second base surface 12. The second cylindrical surface 11 is configured to contain the threaded channel 13, and also provide enough surface area for the user to hold onto during the alignment process. The second base surface 12 is concentrically positioned on the central axis 24. This configuration ensures the entire second weight body 8 is properly aligned to the central axis 24 and set the standard during the alignment process. The threaded channel 13 traverses into the second weight body 8 about the second apex 10. The user may threadedly introduce the threaded tubular shaft 21 into the threaded channel 13 of the second weight body 8 for storage. During the alignment process, the user may remove the threaded tubular shaft 21 from the threaded channel 13 of the second weight body 8, then place the second weight body 8 to the opening of the flange and initiate the alignment process.

Figure 10:
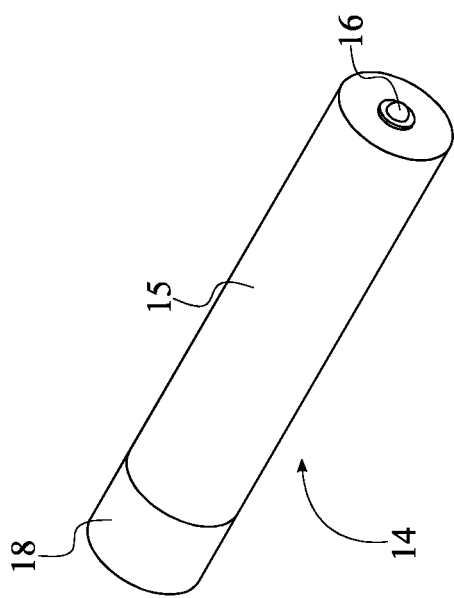
FIG. 10 is a prospective view of the laser pointer unit showing the laser bulb.
Figure 9:
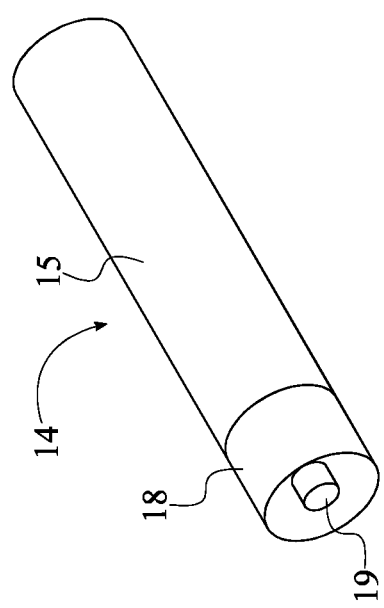
FIG. 9 is a prospective view of the laser pointer unit showing the cap and the on/off switch.
Figure 11:
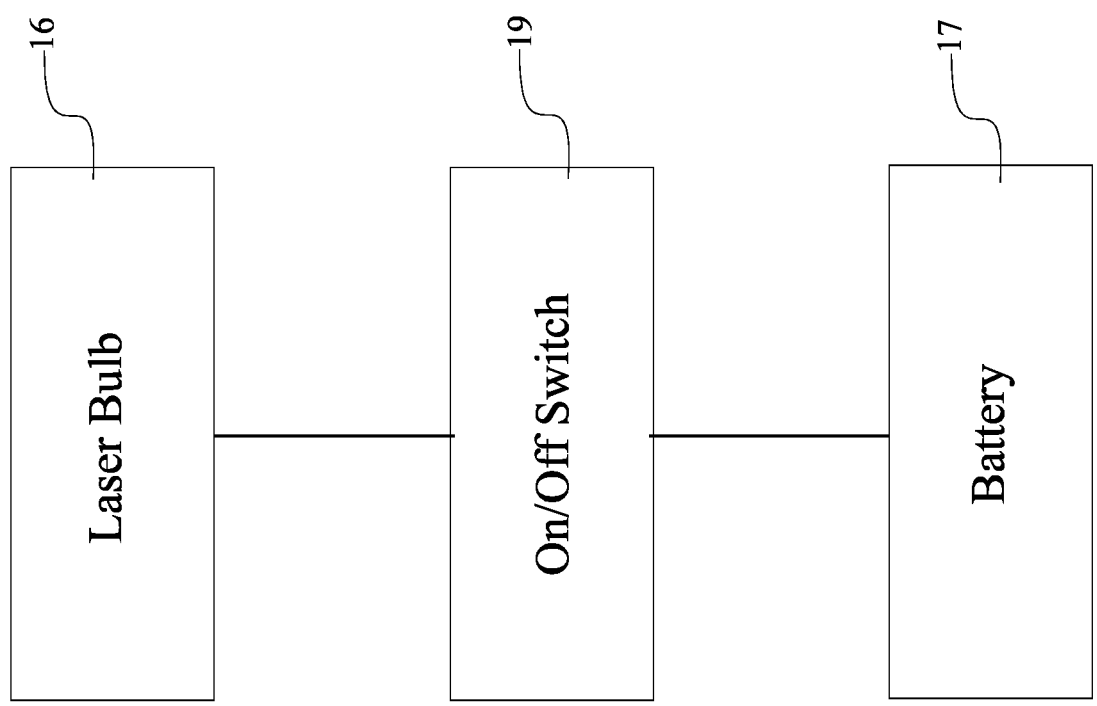
FIG. 11 is a circuit diagram of the laser pointer unit.
Figure 12:
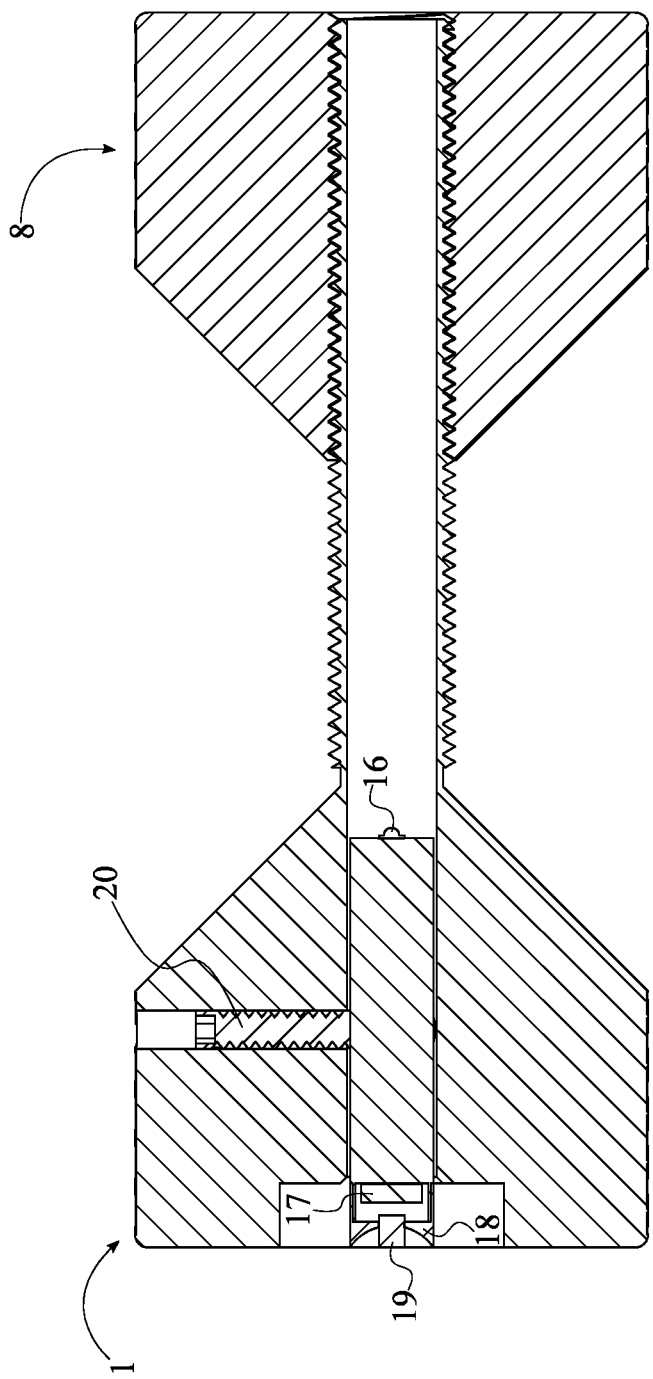
FIG. 12 is a cross section view of the present invention.

In reference to FIGS. 9, 10, and 12, the laser pointer unit 14 comprises a housing 15, a laser bulb 16, a battery 17, a cap 18, and an on/off switch 19. The laser bulb 16 is concentrically connected to the housing 15. The laser bulb 16 is configured to emit the beam of laser during the alignment process. The battery 17 is positioned within the housing 15, opposite of the laser bulb 16. The battery 17 is configured to supply electricity to the laser bulb 16. The on/off switch 19 is terminally integrated into the cap 18. The user may turn on the laser pointer unit 14 by pressing the on/off switch 19 on the cap 18 during the alignment process, and then turn off the laser pointer unit 14 when the alignment process is completed. The cap 18 is terminally attached to the housing 15, opposite of the laser bulb 16. The user may remove the cap 18 to replace the battery 17. The cap 18 is configured to prevent dust or other foreign objects from contacting the battery 17 or other electrical components of the laser pointer unit 14. The laser bulb 16 is electrically connected to the battery 17 through the on/off switch 19. The user may turn-on or turn-off the laser bulb 16 via the on/off switch 19.

In reference to FIGS. 3 and 4, the housing 15 is concentrically positioned within the access channel 6. This configuration ensures the beam of laser emitted by the laser pointer unit 14 is parallel to the central axis 24. The laser bulb 16 is oriented toward the threaded tubular shaft 21. This configuration ensures the beam of laser emitted by the laser pointer traverses through the threaded tubular shaft 21 and the second weight body 8. The cap 18 is positioned adjacent to the first base surface 5 of the first weight body 1. This configuration allows the user to turn on the laser pointer unit 14 when the user's hand is contacting the first base surface 5.

In reference to FIGS. 3, 5, and 7, the first end 22 of the threaded tubular shaft 21 is terminally connected to the first conical surface 2 about the first apex 3 of the first conical surface 2. This configuration ensures that during the alignment process, the first weight body 1 and the threaded tubular shaft 21 are properly positioned when introducing into the flange opening. The second end 23 and the threaded channel 13 of the second weight body 8 are threaded engaged with each other. During the alignment process for the riser and carrier pipes, the user may introduce the threaded tubular shaft 21 through the flange opening so the first weight body 1 is positioned on one side of the flange while the second weight body 8 is positioned on the other side of the flange and user the present invention as an alignment pin. The user may remove the second weight body 8 by unscrewing the threaded channel 13 from the second end 23 of the threaded tubular shaft 21 during the alignment process. The user then place the second weight body 8 onto another flange or other object for different types of alignments, with the first apex 3 and the second apex 10 oriented toward each other during the alignment. The user may reattach the second weight body 8 by screw the threaded channel 13 to the second end 23 of the threaded tubular shaft 21 during storage.

Figure 6:
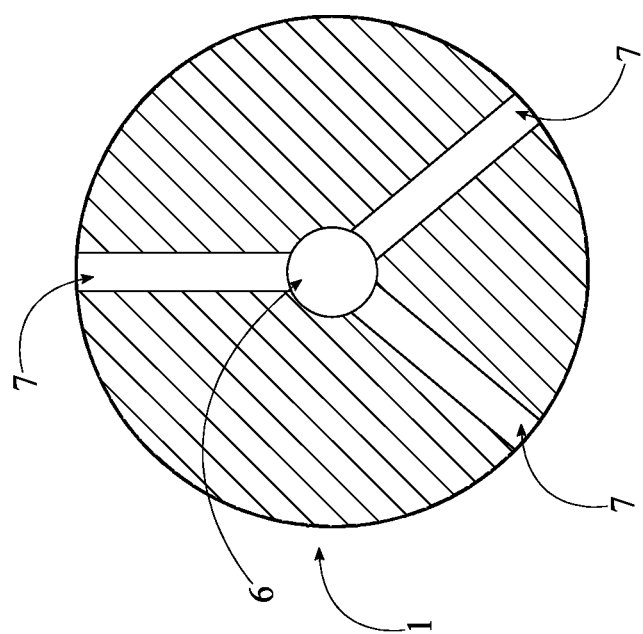
FIG. 6 is a cross section view of the first weight body taken along line A-A of FIG. 4.

In reference to FIGS. 3 and 6, the present invention comprises the plurality of alignment fasteners 20. Each of the plurality of alignment fasteners 20 engaged with the housing 15 of the laser pointer unit 14 through a corresponding opening of the plurality of fastener openings 7. When the user notices that the beam of laser emitted by the laser pointer unit 14 is no longer parallel to the central axis 24, the user may realign and calibrate the laser pointer unit 14 by adjusting the position of the plurality of alignment fasteners 20, which is positioned within the corresponding opening of the plurality of fastener openings 7.

Although the invention has been explained in relation to its preferred embodiment, it is to be understood that many other possible modifications and variations can be made without departing from the spirit and scope of the invention.

What is claimed is:
1. A laser aligning tool comprises:
   a first weight body;
   a second weight body;
   a laser pointer unit;
   a threaded tubular shaft;
   a central axis;
   the threaded tubular shaft comprising a first end and a second end;

the first weight body, the second weight body, the laser pointer unit, the threaded tubular shaft being concentrically positioned along the central axis;

the second weight body being threadedly engaged with the second end of the threaded tubular shaft;

the first weight body being terminally connected with the first end of the threaded tubular shaft;

the laser pointer unit being internally connected to the first weight body;

the first weight body comprising a first conical surface, a first cylindrical surface and a first base surface;

the first conical surface comprising a first apex;

the first base surface being concentrically positioned around the central axis;

the first cylindrical surface being perimetrically connected around the first base surface;

the first conical surface being perimetrically connected around the first cylindrical surface, opposite of the first base surface;

the first apex being externally oriented about the first weight body;

the second weight body comprising a second conical surface, a second cylindrical surface, a second base surface and a threaded channel;

the second conical surface comprising a second apex;

the second base surface being concentrically positioned around the central axis;

the second cylindrical surface being perimetrically connected around the second base surface;

the second conical surface being perimetrically connected around the second cylindrical surface, opposite of the second base surface;

the second apex being externally oriented about the second weight body;

the first apex and the second apex being oriented towards each other;

the threaded channel penetrating the second weight body about the second apex along the central axis;

the first end of the threaded tubular shaft being terminally connected to the first apex; and the second end of the threaded tubular shaft being threadedly engaged into the threaded channel.

2. The laser aligning tool as claimed in claim 1 comprises:

the first weight body further comprising an access channel and a plurality of fastener openings;

the access channel traverses through the first weight body along the central axis;

the plurality of fastener openings being radially distributed around the first cylindrical surface; and the plurality of fastener openings traverses into the first weight body from the first cylindrical surface to the access channel.

3. The laser aligning tool as claimed in claim 1 comprises:

the laser pointer unit comprising a housing, a laser bulb, a battery, a cap, and an on/off switch;

the laser bulb being concentrically connected to the housing;

the battery being positioned within the housing, opposite of the laser bulb;

the on/off switch being terminally integrated into the cap;

the cap being terminally attached to the housing, opposite of the laser bulb;

the battery being internally enclosed with the housing by the cap; and the laser bulb being electrically connected to the battery through the on/off switch.

4. The laser aligning tool as claimed in claim 3 comprises:

the housing being concentrically positioned within the access channel;

the laser bulb being oriented toward the threaded tubular shaft;

the cap being positioned adjacent to the first base surface.

5. The laser aligning tool as claimed in claim 1 comprises:

a plurality of alignment fasteners;

the first weight body comprising a plurality of fastener openings; and each of the plurality of alignment fasteners engaged with a housing of the laser pointer unit through a corresponding opening of the plurality of fastener openings.

* * * * *